(Model.)
R. H. BULLOCK & W. G. FAIRCHILD.
PERPETUAL CALENDAR.
No. 534,628. Patented Feb. 26, 1895.
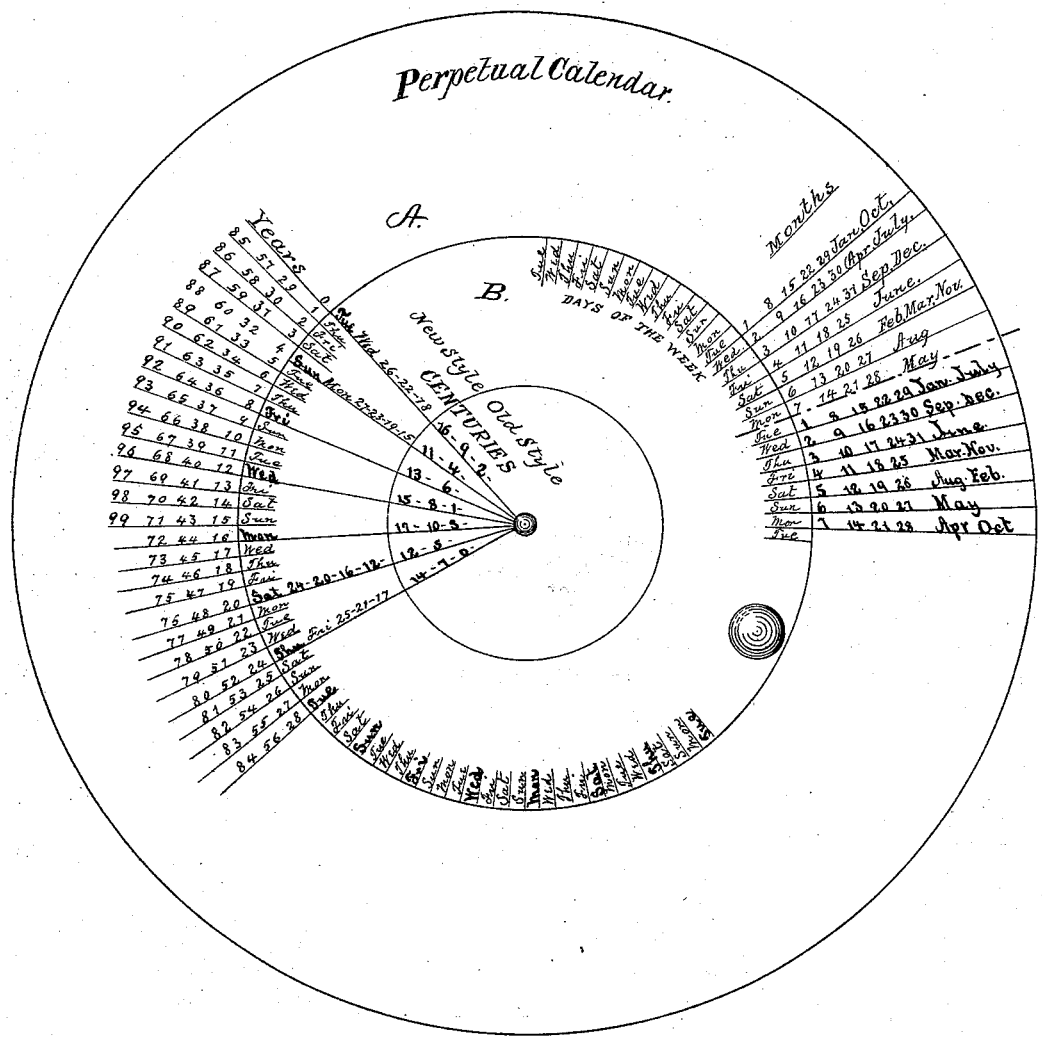

UNITED STATES PATENT OFFICE.

ROBERT H. BULLOCK AND WILLIAM G. FAIRCHILD, OF SAVANNAH, GEORGIA.

PERPETUAL CALENDAR.

SPECIFICATION forming part of Letters Patent No. 534,628, dated February 26, 1895.

Application filed December 3, 1894. Serial No. 530,707. (Model.)

*To all whom it may concern:*

Be it known that we, ROBERT H. BULLOCK and WILLIAM G. FAIRCHILD, citizens of the United States, residing at Savannah, in the county of Chatham and State of Georgia, have invented certain new and useful Improvements in Perpetual Calendars; and we do hereby declare the following to be a full, clear, and exact description of the invention, such as will enable others skilled in the art to which it appertains to make and use the same.

The object of our invention is to produce in a simple and compact form a perpetual calendar.

The nature of the invention will be described below, and pointed out in the claim.

The drawing is a plan view.

Like letters refer to like parts.

"A" is the large disk. This may be made of card-board, or any suitable material. It is stationary, and may be fastened to any suitable back, or held in hand. On the left of said disk is placed the word "Years," in prominent type, and to the right of this a cipher (0). Below, in circular arrangement to accommodate the smaller disk, hereinafter described, follow numerals, placed as shown, from 1 to 99, inclusive, representing years. Below "Years," four numerals are placed on each line, down to the fifteenth line inclusive, and below that three. Differently stated, the first downward arrangement of numerals beyond the periphery of the smaller disk runs from 1 to 28, inclusive, outside of that from 29 to 56, then from 57 to 84, and then from 85 to 99. On the right of disk A, outside of the periphery of the smaller disk, are placed, in circular arrangement, numerals representing the days of the month, from 1 to 31, inclusive, and outside of this, under the word "Months" the names of the months. On the first line are placed January and October, on the next April and July, on the next September and December, on the next June, on the next February, March and November, on the next August, and on the next May. Immediately below, see dot and dash line, in colored ink or distinctive type, the same order of numerals is repeated; but the names of the months are differently arranged. January and July appear together, then September and December, then June alone, then March and November, then August and February, then May alone, and then April and October.

B represents the smaller, or revolving disk, which may be of any suitable material. About the center, at a proper distance is drawn a circle. On seven radial lines in red, or distinctive type, are numerals representing old style centuries, the words "Old style" appearing above as a direction, and the word "Centuries" partly within said circle. On the first line appear the numerals 16, 9 and 2; on the second, 11 and 4; on the third, 13 and 6; on the fourth, 15 and 8; and 1; on the fifth, 17, 10 and 3; on the sixth, 12 and 5, and on the seventh, 14, 7 and 0. Beyond said circle, on some of the radials, are numerals for new style centuries. See also words "New style" as a direction. The first line has 26, 22 and 18; the second, 27, 23, 19 and 15; the third, fourth and fifth have none; the sixth, 24, 20, 16 and 12, and the seventh, 25, 21 and 17. Near the periphery of the disk, outside the first radial, begins a semi-circular arrangement of days, which may be called the reference days in connection with the year numerals. There are sixty of these days, counting the two on the first, second and seventh radials. They begin and end with Tuesday, but are not in consecutive order throughout. The first day (Tuesday) should be in red ink or distinctive type, likewise every fourth day after that, and the intermediate three days in black ink; likewise Wednesday, Monday and Friday adjacent to Tuesday, Sunday and Thursday. See first, second and seventh radials. By having the above number of days, there will be a reference day for any year of any century within the present scope of this calendar; or, for instance, when the numeral 14 or 7 "old style" is turned opposite to the word "Years."

The "old style" centuries should be printed in red or peculiar type to distinguish them, and the "new style" in black, except on the sixth radial, where they should be in red. The reason, however, for making some centuries red and others black in the manufactured calendar is not wholly to distinguish them, but also to indicate that when the first year of a century is under consideration the reference day of said year should be red for the red centuries and black for the black centuries. The arrangement of the old and new style century numerals and reference days as shown is to cover the leap years and obviate any calculation for them. On the right of this smaller disk are placed "Days of the week," twenty-nine in number, beginning and ending on Tuesday, and arranged consecutively. The days need not begin with Tuesday necessarily, but should be of such number as to cover not less than double the range of months, for convenience. They should be in black ink, and their purpose is to register with any desired month, when the reference day of any year is established, as will appear under the mode of operation, which is as follows:

To get the calendar for December, 1894, turn 18 under "new style" centuries in line with the word "Years." Then opposite 94 will appear Monday in black type, which is the reference day throughout this year. Next, under "Days of the week," turn Monday in line with December first occurring below the word "Months," which gives the calendar for that month, which begins on Saturday. To find April, 1884, repeat the process. Tuesday, a red day, will appear opposite 84 as a reference day. Now turn Tuesday, in "Days of the week" in line with "April" in red, and the calendar of that month will appear. In other words, the red days refer to the red months and the black days to the black months. When the first year of a century is under consideration, take the black day on the same line as the century for the "new style," and the red day for the "old style," where two days occur on the same line. In Catholic countries for dates after March 20, 1582, use "new style," and for dates before March 12, 1582, use "old style." In States of Germany, for dates after March 20, 1700, use "new style;" for dates before March 12, 1700, use "old style." For Kingdom of Denmark, use the same as for Germany. For England, for dates after September 13, 1752, use "new style;" for dates before September 4, 1752, use "old style." Under the present combination, this calendar could be extended for centuries. We propose to make the large disk in any desired shape, and also to leave space for advertising purposes, if desired; likewise, in directions for operations, to employ different colors of ink or distinctive type, as the case may be. What is referred to as "red days," "red months," and "red centuries" appear in the drawing in a form of lettering and numbering which will distinguish them.

Having described our invention, what we claim, and desire to secure by Letters Patent, is—

The combination with the larger, stationary disk having year numerals contiguous to the periphery of the smaller disk, the monthly tables near the periphery differently arranged, substantially as shown, and adjacent numerals representing days of the month, of the smaller, revolving disk having numerals for the old and new style centuries, a peripheral table of yearly reference days, and a separate peripheral table of days of the week for registering the established reference day of the chosen year with any month of that year, as set forth.

In testimony whereof we affix our signatures in presence of two witnesses.

ROBERT H. BULLOCK.
WILLIAM G. FAIRCHILD.

Witnesses:
A. B. ELARBEE,
R. C. ULMER.